United States Patent [19]

Watanabe et al.

[11] 4,147,894

[45] Apr. 3, 1979

[54] TIME DIVISION MULTIPLEX COMMUNICATION DEVICE COMPRISING A SWITCHING MATRIX BETWEEN C/E BUFFERS AND CONTROL CIRCUITS

[75] Inventors: Yoshio Watanabe, Yokosuka; Akio Saburi, Tokyo, both of Japan

[73] Assignees: Nippon Telegraph & Telephone Public Corp.; Nippon Electric Co., Ltd., both of Tokyo, Japan

[21] Appl. No.: 836,666

[22] Filed: Sep. 26, 1977

[30] Foreign Application Priority Data

Oct. 8, 1976 [JP] Japan ............................... 51-121088

[51] Int. Cl.[2] ............................................... H04J 3/00

[52] U.S. Cl. .............................. 179/15 A; 179/15 BS

[58] Field of Search ........... 179/15 A, 15 BS, 15 AT, 179/15 BV; 325/4; 178/69.1

[56] References Cited

U.S. PATENT DOCUMENTS 3,825,899 7/1974 Haeberle ......................... 179/15 BS

*Primary Examiner*—Kathleen H. Claffy

*Assistant Examiner*—Joseph A. Popek

*Attorney, Agent, or Firm*—Ostrolenk, Faber, Gerb & Soffen

[57] ABSTRACT

Like a conventional time division multiplex communication device, a device according to this invention comprises first terminals, a switching matrix, transducers or C/E buffers, control circuits, and second terminals. The first and second terminals are for low-speed and high-speed signal sequences. The control circuits are connected to the second terminals. In contrast to the conventional one, the transducers are connected to the respective first terminals, with the switching matrix interposed between the transducers and the control circuits and rendered capable of dealing with the high-speed signal sequences, among others, rather than the low-speed ones as in the conventional device. The devices are particularly useful in earth stations of TDMA satellite communication to which multi-transponder operation is applied, although useful also in carrying out conversion between low-frequency analog signal or PAM signal sequences and PAM signal sequences of a higher rate.

10 Claims, 7 Drawing Figures

TIME DIVISION MULTIPLEX COMMUNICATION DEVICE COMPRISING A SWITCHING MATRIX BETWEEN C/E BUFFERS AND CONTROL CIRCUITS

BACKGROUND OF THE INVENTION

This invention relates to a time division multiplex communication device for time division multiplexing a plurality of low-speed signal sequences into a plurality of high-speed signal sequences and/or for time division demultiplexing a plurality of high-speed signal sequences, into which a plurality of low-speed signal sequences are time division multiplexed, into the original low-speed signal sequences. A device according to this invention is particularly useful in an earth or ground station of satellite communication.

In satellite communication, a plurality of transponders are generally carried by each satellite. A frequency band is divided according to frequencies and assigned to the respective transponders. According to conventional satellite communication techniques, these transponders serve for individual communication links. In contrast, multi-transponder operation has recently been developed, wherein a plurality of transponders are simultaneously employed in a single communication link to raise flexibility and efficiency of operation of the whole single link.

On the other hand, recent improvements in the integrated circuit art have enabled highly developed digital communication techniques to be applied to satellite communication. For example, pulse code modulation-phase shift keying (PCM-PSK) is rendered readily applicable to time division multiple access (TDMA) satellite communication.

In a conventional device of the type set forth at the outset of the instant specification, use is made of space division switching techniques. An example is shown in FIG. 1 accompanying an article contributed by Y. Watanabe, one of the inventors of the present invention, to papers for "Third International Conference on Digital Satellite Communication," held Nov. 11 to 13, 1975, pages 385–393, under the title of "A New TDMA System for Domestic Service and its High Speed Modem," As will later be described with reference to one of several figures of the drawing accompanying the instant specification, use is necessary, in a conventional device of the type mentioned hereinabove, of a great number of transducers and a terribly great number of switching contacts. The conventional device is therefore bulky and expensive.

SUMMARY OF THE INVENTION

It is therefore an object of the present invention to provide a time division multiplex communication device of the type described, which is small in size and yet is not expensive.

It is another object of this invention to provide a device of the type described, which enables the multi-transponder operation to be economically introduced into TDMA satellite communication.

A time division multiplex communication device according to the present invention is for carrying out conversion between a preselected portion of each of a plurality of first signal sequences of a first rate, N in number, and a prescribed portion of each of a plurality of second signal sequences of a second rate, M in number, in response to first clock pulse sequences corresponding to the first signal sequences, respectively, and to second clock pulse sequences corresponding to the second signal sequences, respectively. The first rate is lower than the second rate. The number N is greater than the other numbeer M. The preselected portion of a pertient one of the first signal sequences is an expansion with respect to time of the prescribed portion of a relevant one of the second signal sequences. The prescribed portions of the second signal sequences are decided in compliance with timing of the second clock pulse sequences.

For the device set forth in the next preceding paragraph, there is provided a combination which comprises first device terminals for the respective first signal sequences, second device terminals for the respective second signal sequences, and transducers, each having a first and a second transducer terminal and a control terminal. The first transducer terminals of the transducers are connected to the respective first device terminals. Each transducer is capable of performing conversion between the preselected portion of a relevant one of the first signal sequences that appears at the first transducer terminal thereof and the prescribed portion of a pertient one of the second signal sequences that appears at the second transducer terminal thereof in response to the first clock pulse sequence corresponding to the relevant first signal sequence and a control signal comprising a first and a second part and supplied to the control terminal thereof. The combination further comprises control circuits, each having a plurality of first circuit terminals corresponding to the respective transducers and a second circuit terminal. The second circuit terminals of the control circuits are connected to the respective second device terminals. Each control circuit is capable of producing a designation signal indicative of a specific one of the transducers in compliance with the timing of a particular one of the second clock pulse sequences that corresponds to the pertinent second signal sequence. The combination still further comprises means between the respective control terminals of the transducers and the respective control circuits for supplying the designation signal to the control terminal of the specific transducer as the first part of the control signal, enabling means connected to the respective control circuits for producing an enabling signal in response to the designation signal, first means connected to the enabling means and to the respective control terminals of the transducers for supplying, in response to the enabling signal, the second clock pulses of the particular second clock pulse sequence to the control terminal of the specific transducer as the second part of the control signal, and second means connected to the enabling means, the respective second transducer terminals of the transducers, and the respective first circuit terminals of the control circuits for transmitting in response to the enabling signal, the prescribed portion of the pertinent second signal sequence between the second transducer terminal of the specific transducer and that relevant one of the first circuit terminals of a relevant one of the control circuits which corresponds to the specific transducer. The relevant control circuit is the control circuit by which the designation signal is produced. Each control circuit comprises transfer means between the first circuit terminals thereof and the second circuit terminal thereof for transferring therebetween the prescribed portion of the second signal sequence appearing at the second circuit terminal thereof. The transfer means of the relevant control circuit thereby transfers the prescribed portion of the pertinent second signal sequence between the relevant first circuit terminal and the second circuit terminal thereof.

The first and second signal sequences may be twenty-four-channel pulse code modulated (PCM) signal sequences of a first bit rate of 1.544 MBPS and multiplexed digital signal sequences of a second bit rate of about 60 MBPS. Another set of examples of the first and second signal sequences are either low-frequency analog signal sequences or pulse code modulated (PAM) signal sequences and PAM signal sequences of a higher rate, respectively. It is to be noted here that the conversion is carried out between the preselected portion and the prescribed portion as set forth in the two next preceding paragraphs. The time division multiplex communication is carried out, as will later be exemplified with reference to a few figures of the accompanying drawing, in each high-speed signal sequence for one or more of the preselected portions of one of the first signal sequences and similar preselected portions of signal sequences that appear with the first rate at those device terminals of like time division multiplex communication devices which correspond to the above-mentioned first device terminals. As exemplified by the twenty-four-channel PCM signal sequences, each first signal sequence may also be a time division multiplexed signal sequence. It is possible to derive the first and second clock pulse sequences from a first and a second clock generator, respectively. The combination may further comprise additional first and second device terminals for additional first and second signal sequences of rates either equal to or different from the first and second rates recited hereinabove. If different, use is further made of additional first and second clock pulse sequences of pertinent rates. For convenience, the first and second signal sequences are herein called low-speed and high-speed signal sequences.

DESCRIPTION OF THE PREFERRED EMBODIMENTS

Figure 1:
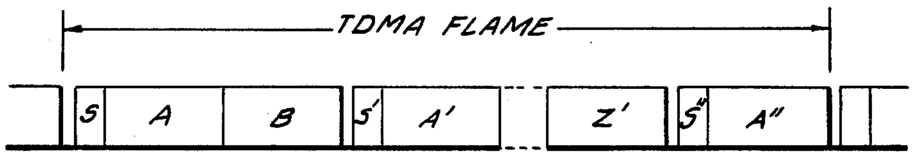
FIG. 1 schematically shows a conventional TDMA frame of a high-speed signal sequence dealt with by a transponder carried by a satellite.
Figure 2:
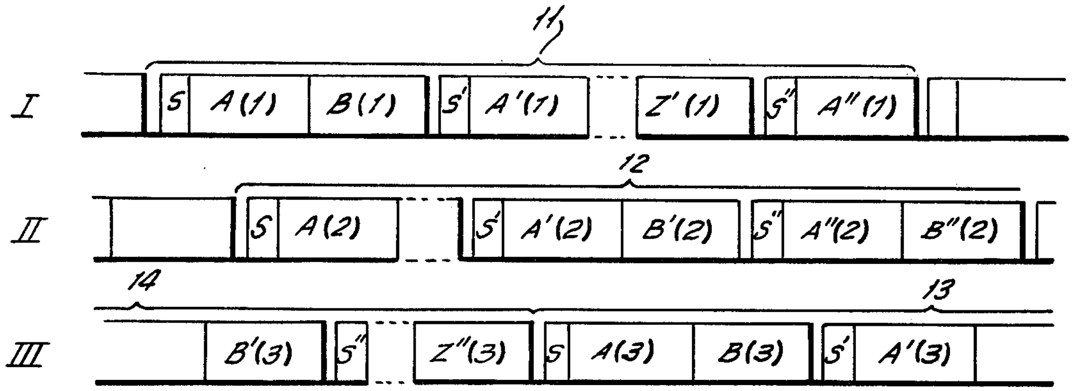
FIG. 2 schematically illustrates several TDMA frames which are used in multi-transponder operation of a TDMA satellite communication link and which are capable of being dealt with by a time division multiplex communication device according to an embodiment of the present invention.

Referring to FIGS. 1 and 2, the multi-transponder operation mentioned in the preamble of the instant specification will briefly be described at first to facilitate understanding of the present invention as applied to TDMA satellite communication. As is known in the art, a high-speed signal sequence sent from a plurality of earth or ground stations (not shown in FIGS. 1 and 2) to a predetermined one of a plurality of transponders carried by a satellite and sent from the transponder to the earth stations or other similar earth stations comprises a sequence of TDMA frames, one of which is schematically illustrated in FIG. 1. In conventional TDMA, that preselected portion of a low-speed signal sequence which has a duration corresponding to each TDMA frame is compressed with respect to time and transmitted to the transponder as a sub-burst, as called herein, of a burst in the TDMA frame in question with TDMA carried out for the TDMA frame. For example, a first earth station transmits a synchronizing signal S (FIG. 1) of a pattern peculiar to the first station, followed by sub-bursts A and B derived as a burst in the TDMA frame from the preselected portions of two low-speed signal sequences. A second earth station likewise sends a synchronizing signal S′ for the second station and sub-bursts A′, . . . , and Z′. A third earth station transmits a synchronizing signal S″ for the third station and a sub-burst A″. As used herein, the term "prescribed portion" will be used to describe each subburts.

In the multi-transponder operation, a plurality of transponders carried by a satellite, such as three transponders I, II, and III symbolically depicted in FIG. 2, deal with first, second and third high-speed signal sequences I, II, and III (designated merely for convenience of illustration by the reference characters of the respective transponders), respectively. In the depicted example, a TDMA frame 11 of the first signal sequence I is composed of a sequence of bursts which are illustrated with reference to FIG. 1, with a numeral "(1)" added to each of the reference characters indicative of the respective sub-bursts. As exemplified, a TDMA frame 12 of the second signal sequence II is composed of a sequence of the synchronizing signal S for the first earth station and sub-bursts A(2) and others sent from the first station, the synchronizing signal S′ for the second earth station and sub-bursts A′(2) and B′(2) transmitted from the second station, and the synchronizing signal S″ for the third earth station and sub-bursts A″(2) and B″(2) transmitted from the third station. Also, a TDMA frame 13 of the third signal sequence III is composed of a sequence of the synchronizing signal S for the first earth station, sub-bursts A(3) and B(3) transmitted from the first station, the synchronizing signal S′ for the second earth station, a sub-burst A′(3) sent from the second station, and so forth. Another TDMA frame 14 preceding the TDMA frame 13 in the third signal sequence III is composed of the synchronizing signal S″ for the third earth station and sub-bursts, including a sub-burst Z″(3), sent from the third earth station and various other preceding synchronizing signals and sub-bursts, a sub-burst B′(3) transmitted from the second earth station inclusive. As shown, the TDMA frames, such as the frames 11 through 13, need not be synchronized to one another but are generally of a predetermined duration. It is possible to time division multiplex a plurality of low-speed signal sequences into sub-bursts, such as A(1), B(1), A(2), . . . , A(3), and B(3) of the high-speed signal sequences I through III and demultiplex these sub-bursts received by the first through third earth stations into the original low-speed signal sequences by time division multiplex communication devices adapted to such signal sequences according to an embodiment of this invention.

Figure 3:
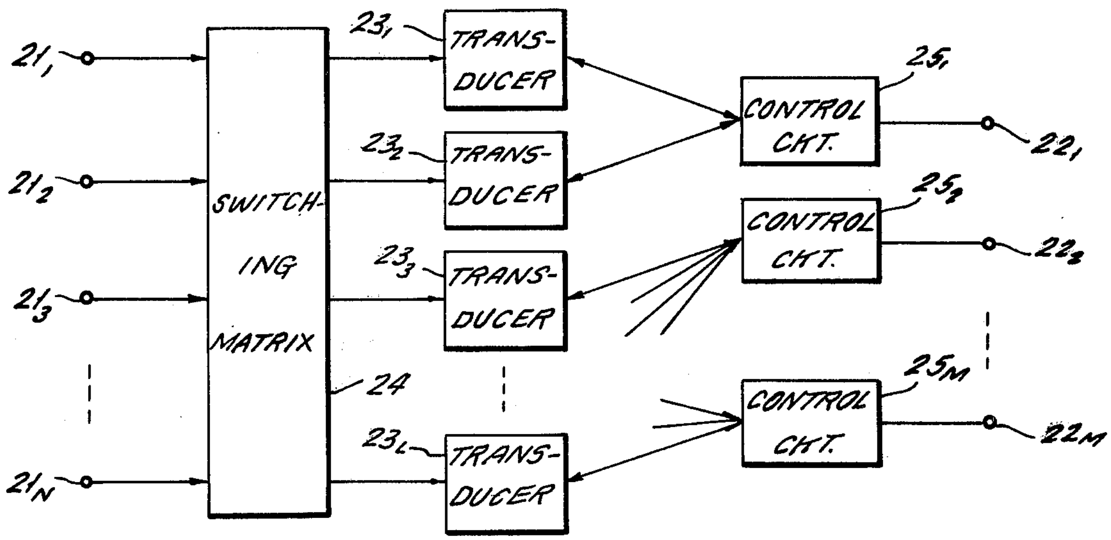
FIG. 3 is a block diagram of a conventional time division multiplex communication device.

Turning to FIG. 3, a conventional time division multiplex communication device, which is mentioned in the preamble of this specification and which is for use in time division multiplexing a plurality of low-speed signal sequences into a plurality of high-speed signal sequences in one of the earth stations described in conjunction with FIG. 2, will be described for a better understanding of this invention. For convenience, a first, a second, and a third number are represented by N, M, and L, respectively, throughout the description. The first number N is the number of the low-speed signal sequences and is greater than the second number M, which is the number of the high-speed signal sequences and consequently the number of transponders accessible from the device. As regards the third number L, description will appear later. The device has device input terminals $21_1$, $21_2$, $21_3$, . . . , and $21_N$ for the respective low-speed signal sequences and device output terminals $22_1$, $22_2$, . . . , and $22_M$ for the respective high-speed signal sequences. The input terminals 21 (suffixes to the reference numeral 21 and other similar reference numerals being omitted when unnecessary) are coupled to a plurality of transducers or compression buffers $23_1$, $23_2$, $23_3$, . . . , and $23_L$, L in number, through a switching matrix 24 comprising switching contacts (not shown), such as crossbar contacts, for distributing the low-speed signal sequences to the transducers 23. A plurality of control circuits $25_1$, $25_2$, . . . , and $25_M$ are connected to the respective output terminals 22. The control circuits 25 thus correspond to the respective transponders. Each of the control circuits 25 is connected to those of the transducers 23 which are predetermined for the control circuit under consideration. This is implied by those lines of connection therebetween, some of which are only partly depicted. Each control circuit selectively supplies the predetermined transducers with a control signal that will become clear as the description proceeds. This is symbolized by arrowheads added to those points of the lines of connection which are adjacent to the respective transducers 23. The transducer to which the control signal is supplied, compresses the preselected portion of that one of the low-speed signal sequences which is distributed thereto to supply the thereby derived sub-burst with correct timing for the TDMA frame of a relevant one of the high-speed signal sequences to one of the output terminals 22 that is connected to the control circuit in question and is for the relevant high-speed signal sequence.

Further referring to FIG. 3, it should be pointed out that the number of low-speed signal sequences capable of being selectively transmitted to each transponder in a relevant one of the high-speed signal sequences is restricted by the number of the predetermined transducers connected to that one of the control circuit 25 which corresponds to the transponder under consideration. It is therefore necessary for augmenting the flexibility of the multi-transponder operation, namely, for raising the economical efficiency of the TDMA satellite communication, to render the number of the predetermined transducers greater than the first number N. In order that perfect flexibility be attained, namely, that all of the low-speed signal sequences be selectively transmitted to any desired one of the transponders, it is indispensable that the third number L or the number of all transducers 23 be equal to a product of the first and second numbers NM. In this case, the number of the switching contacts of the switching matrix 24 must be equal to a product of the first and third numbers NL or $N^2M$.

Figure 4:
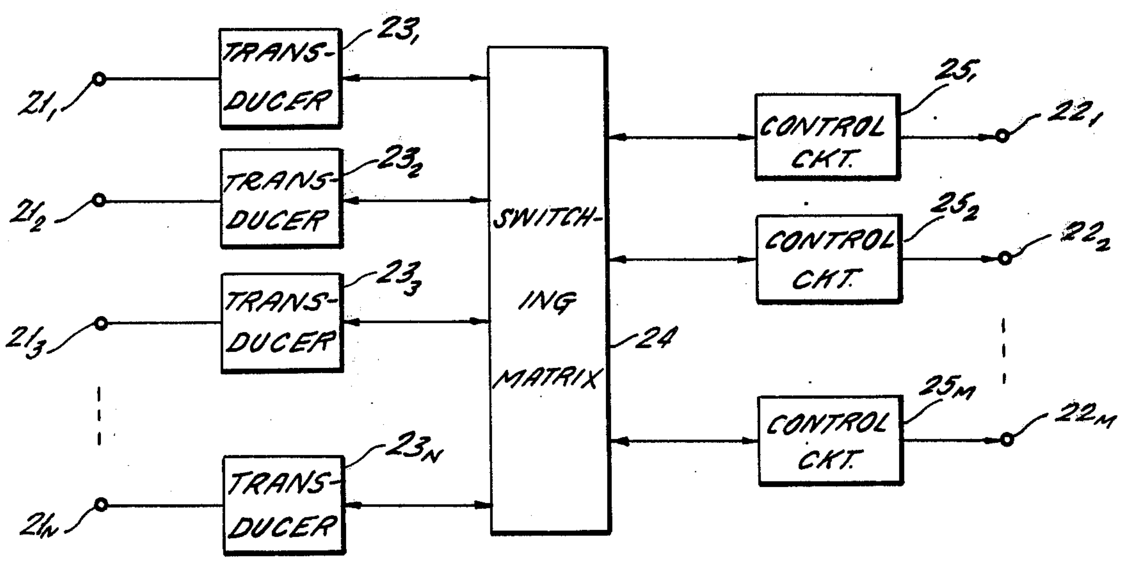
FIG. 4 is a block diagram of a time division multiplex communication device according to a first preferred embodiment of this invention.

Referring now to FIG. 4, a time division multiplex communication device according to a first preferred embodiment of this invention is for use in place of the conventional device illustrated with reference to FIG. 3 and comprises device input and output terminals $21_1$ through $21_N$ and $22_1$ through $22_M$, transducers $23_1$ through $23_N$, a switching matrix 24, and control circuits $25_1$ through $25_M$, all similar to the corresponding elements of the conventional device. In marked contrast to the conventional device, the transducers 23 are connected to the respective input terminals 21 in one-to-one correspondence. The switching matrix 24 is interposed between the transducers 23 and the control circuits 25. The transducer to which a control signal is supplied from a relevant one of the control circuits 25 through the switching matrix 24, derives the above-described sub-burst or sub-bursts with correct timing from one or more of the preselected portion of one of the low-speed signal sequences that is supplied directly thereto. Through the switching matrix 24, the relevant control circuit, and the output terminal connected thereto, the sub-burst is transmitted to a pertinent one of the transponders in a TDMA frame of the high-speed signal sequence for the last-mentioned output terminal. It is now sufficient that the number of the transducers 23 be equal to the first number N rather than to the third number L and that the number of those connection controlling circuits (not shown in FIG. 4) of the switching matrix 24, which correspond to the switching contacts mentioned hereinabove, be at most equal to a product of the first and second numbers NM rather than to the product $N^2M$ of the first and third numbers. The whole device is accordingly astonishingly smaller in size as compared with the conventional device of the same flexibility. Inasmuch as the low-speed signal sequences dealt with by the respective transducers 23 are specific thereto, the transducers 23 need not be adapted to various low-speed signal sequences that may have, as pointed out in the preamble of the instant specification, different first rates.

By way of example, let it be surmised that the low-speed and high-speed signal sequences be, as referred to hereinabove, twenty-four-channel PCM signal sequences (1.544 MBPS) and 60-MBPS multiplexed digital signal sequences and that the number M of the transponders be six. The number of the predetermined transducers connected to each of the control circuits 25 is about forty for the perfect flexibility. For the conventional device, the third number L of all transducers 23 must therefore be about two hundred and forty. The number of the switching contacts must be as great as about nine thousand and six hundred. For a device according to the first preferred embodiment of this invention, the number of all transducers 23 may be only forty. The number of the connection controlling circuits may therefore be as small as two hundred and forty. It is, however, necessary that the switching matrix 24 used in a device according to this invention be capable of dealing at a high switching speed with the bursts of the high-speed signal sequences, among others, rather than with the low-speed signal sequences. This gives rise to no serious problems because it is readily feasible to achieve the high switching speed with the present-day integrated circuit techniques without any adverse effects on the commercial economy of the switching matrix 24.

Figure 5:
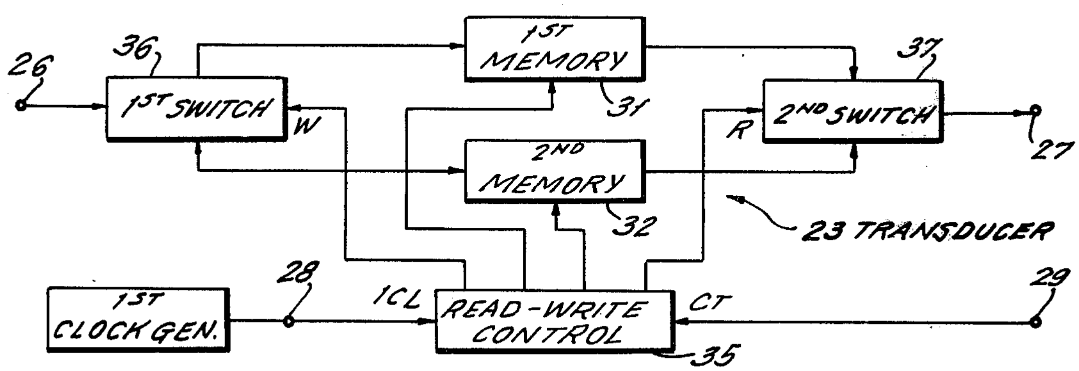
FIG. 5 is a block diagram of a transducer used in the conventional device illustrated in FIG. 3.

Turning to FIG. 5, each of the transducers 23 used in the conventional device has a transducer input terminal 26 connected to the switching matrix 24, a transducer output terminal 27 connected to a relevant one of the control circuits 25, a transducer clock terminal 28 for a transducer or first clock pulse sequence 1CL of a first clock rate equivalent to the first rate of that pertinent one of the low-speed signal sequences which is distributed to the transducer input terminal 26, and a control terminal 29 for a control signal CT supplied thereto from the relevant control circuit. The transducer 23 comprises first and second memories 31 and 32, each of which has a memory capacity sufficient for one of the preselected portions of the low-speed signal sequence, or in other words, sufficient for a TDMA frame of the high-speed signal sequence to be delivered from the transducer output terminal 27 to the relevant control circuit. Responsive to the clock pulses of the sequence 1CL and to the control signal CT, a read-write controlling circuit 35 produces a write-in switching signal W, a read-out switching signal R, and memory controlling signals which are produced simultaneously with the write-in and read-out switching signals W and R, respectively. According to the polarity of the write-in switching signal W, a first switch 36 supplies the preselected portions of the pertinent low-speed signal sequences alternatingly to the memories 31 and 32 from the transducer input terminal 26. Responsive to the controlling signals, the memories 31 and 32 store as contents thereof successive sequences of the preselected portions alternatingly. On the whole, the pertient low-speed signal sequence is written in the two memories 31 and 32 continuously. Depending upon the read-out switching signal R, a second switch 37 connects the transducer output terminal 27 to that one of the memories 31 and 32 which is not supplied with one of the successive sequences of the preselected portions for the time being. The contents of the memories 31 and 32 to which the controlling signals are supplied are alternatingly supplied to the transducer output terminal 27 through the second switch 37 as sub-bursts at the second rate of the high-speed signal sequence in question. It is to be understood that the preselected portions are extracted from the pertinent low-speed signal sequence by a frame synchronizing signal supplied together with the clock pulse sequence 1CL. As will later become clear, each of the transducers 23 used in a device according to the preferred embodiment of this invention is similar in structure. It may be mentioned here that the control terminal 29 is supplied, as a variation of the control signal CT, with a designation signal described below and thus serves also as a designation input terminal.

Figure 6:
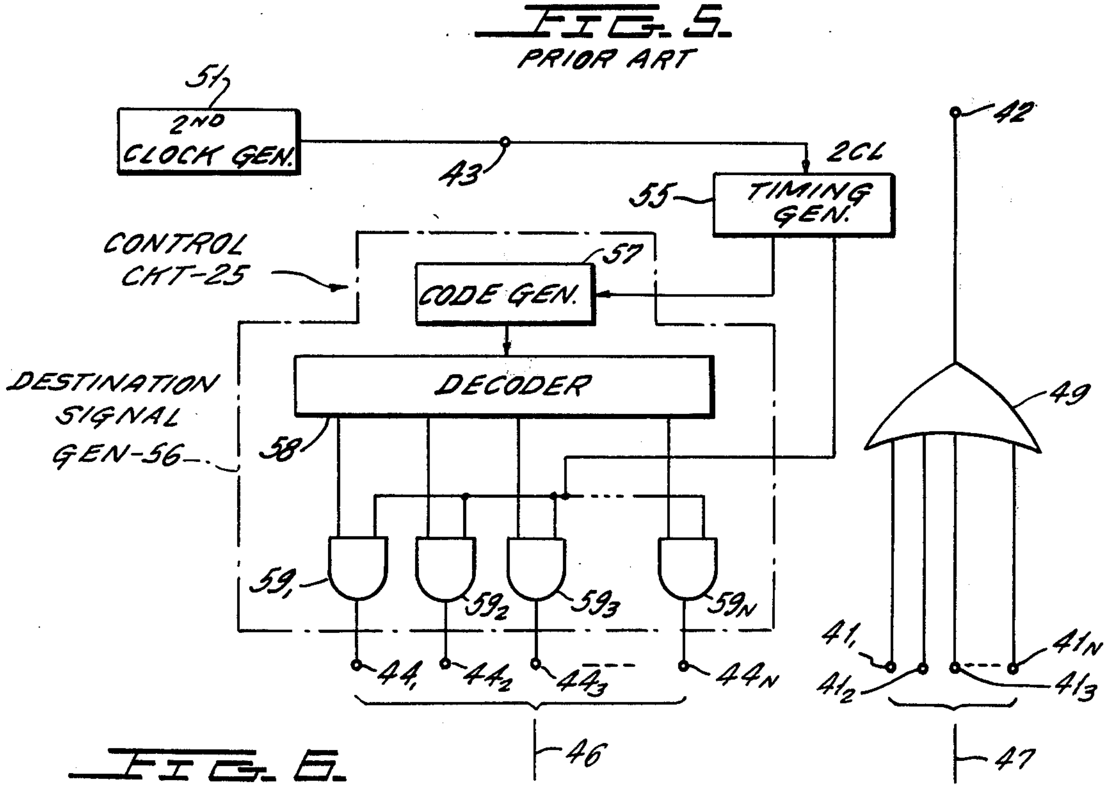
FIG. 6 is a block diagram of a control circuit used in a device depicted in FIG. 4.

Referring to FIG. 6, each of the control circuits 25 used in a device according to the first preferred embodiment of this invention has a plurality of circuit input terminals $41_1$, $41_2$, $41_3$, . . . , and $41_N$ corresponding to the transducers $23_1$, $23_2$, $23_3$, . . . , and $23_N$, respectively, a circuit output terminal 42, a circuit clock terminal 43, and a plurality of designation output terminals $44_1$, $44_2$, $44_3$, . . . , and $44_N$ corresponding to the respective transducers 23 and consequently to the respective input terminals 41. The designation output terminals 44 are connected to the switching matrix 24 through a plurality of designation output leads 46, N in number, so that a designation signal supplied to a pertinent one of the designation output terminals 44 in a manner to be presently described may be delivered, through the switching matrix 24, to the control terminal 29 of a specific one of the transducers 23 that corresponds to the pertient designation output terminal. The designation signal thus specifies or designates the specific transducer and activates the same so as to produce the sub-burst, which becomes the prescribed portions of a relevant high-speed signal sequence in the manner to be shortly described. The input terminals 41 of each control circuit are connected to the switching matrix 24 through a plurality of sub-burst input leads 47, N in number, so that the sub-burst produced by the specific transducer may reach, through the switching matrix 24, a relevant one of the input terminals 41 that corresponds to the specific transducer. The input terminals 41 are connected to the circuit output terminal 42 through an N-input OR gate 49. The circuit output terminals, such as 42, of the control circuits 25 are connected to the respective device output terminals 22. The sub-burst is thus supplied from the circuit output terminal 42 of a relevant one of the control circuits 25 to the device output terminal concerned to be transmitted to a related one of the transponders as the sub-burst of the relevant one of the high-speed signal sequences. The control circuits 25 are accompanied by known read-out clock generators $51_1$, $51_2$, . . . , and $51_M$ for producing read-out or second clock pulse sequences $2CL_1$, $2CL_2$, . . . , and $2CL_M$ (herein designated by 51 and 2CL, respectively, with the suffixes omitted), respectively, which control timing of the sub-bursts in the TDMA frames of the respective high-speed signal sequences. The second clock pulse sequences 2CL have a second clock rate equivalent to the second rate of the high-speed signal sequences and thus correspond to the respective high-speed signal sequences. The timing of the second clock pulse sequences 2CL furthermore makes the control circuits 25 produce the designation signal or signals so that each of the transducers 23 may be supplied with only one designation signal within a predetermined duration.

Further referring to FIG. 6, the control circuit 25 comprises a timing generator 55 for successively producing timing pulses in response to the second clock pulse sequences 2CL corresponding to the relevant high-speed signal sequence for the control circuit in question. Timed by the clock pulse sequence 2CL, the timing generator 55 successively produces also a read-out controlling signal that specifies, in the manner known in the art, that instant in each of a predetermined duration, such as the duration of each TDMA frame, of the relevant high-speed signal sequence from which the burst should be supplied to the pertinent device output terminal through the control circuit under consideration. The predetermined duration should cover a plurality of the prescribed portions. The timing pulses are supplied to a designation signal generator 56, or more particularly, to a code generator 57 included therein, to make the code generator 57 cyclically produce designation codes corresponding to the respective transducers 23. The designation signal generator 56 comprises a decoder 58 having output connections, again corresponding to the respective transducers 23, for decoding the designation codes to cyclically energize the connections, and a plurality of AND gates $59_1$, $59_2$, $59_3$, . . . , and $59_N$ supplied simultaneously with the read-out controlling signal and connected to the respective connections to be cyclically enabled upon energization of the connections and to the respective designation output terminals 44. When the read-out controlling signal is produced upon energization of a particular one of the output connections that corresponds to the transducer to be specified, one of the AND gates 59 connected to the particular connection produces the controlling signal. The designation signal generator 56 therefore supplies a designation signal to a pertinent one of the designation output terminals 44 in response to the timing of the clock pulse sequence 2CL and, in effect, to the timing pulses.

Finally referring to FIG. 7, a time division multiplex communication device according to an aspect of the first preferred embodiment of this invention comprises device input and output terminals $21_1$ through $21_N$ and $22_1$ through $22_M$, transducers $23_1$ through $23_N$, a switching matrix 24, and control circuits $25_1$ through $25_M$, all described hereinabove. Each of the transducers 23 is accompanied by first and second M-input OR gates 61 and 62. The inputs of the first OR gate 61 are connected to the designation output leads 46 of all control circuits 25 through a plurality of designation input leads 64, M in number. A designation signal that is produced by a relevant one of the control circuits 25, and which is indicative of a specific one of the transducers 23, is supplied to the control terminal 29 of the specific transducer through the first OR gate 61 accompanying the specific transducer. It is therefore possible that a designation signal is supplied to any one of the transducers 23 from any one of the control circuits 25 without passing through the switching matrix 24. The switching matrix 24 comprises, as described hereinabove, a plurality of connection controlling circuits, NM in number, which are assigned to the respective transducers 23, on the one hand, and to the respective control circuits 25, on the other hand. The controlling circuits assigned to each control circuit comprises memories 65, respectively, which are connected to the respective designation output leads 46 for the control circuit under consideration. Each of the memories 65 may simply be a flip-flop circuit. The designation signal sets a specific one of the memories of the controlling circuit assigned to the specific transducer and to the relevant control circuit that produces the designation signal. Preferably, each memory 65 is capable of being automatically reset, after set by a designation signal, unless another designation signal is supplied thereto in the next following one of the predetermined durations defined hereinabove. This is preferred particularly in the multi-transponder operation for the purpose of enabling the low-speed signal sequence supplied to an optional one of the device terminals 21 and transmitted as a relevant one of the high-speed signal sequences to be switched from the relevant one to another without troubles. While set, the memory 65 produces an enabling signal.

Figure 7:
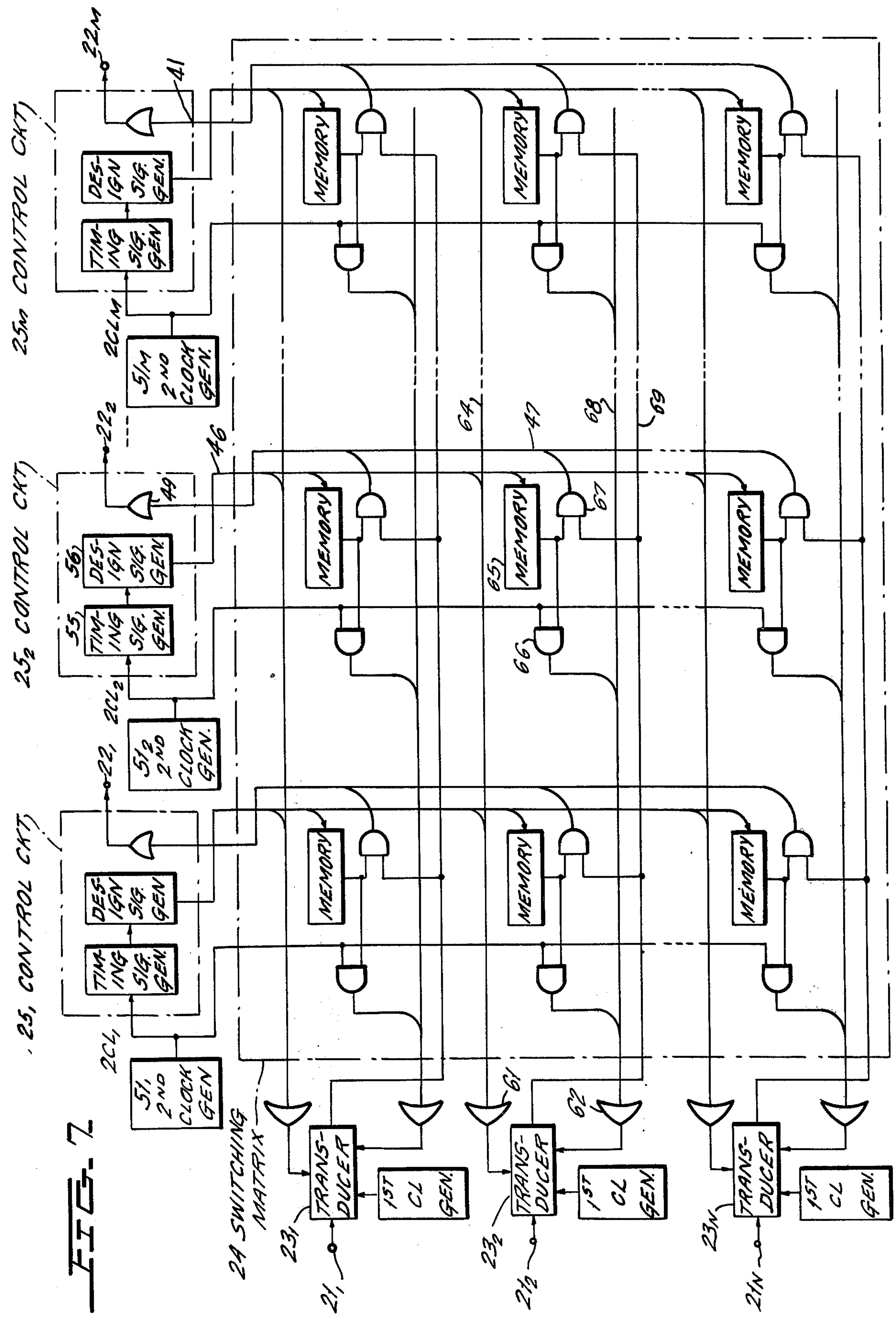
FIG. 7 is a block diagram of a time division multiplex communication device according to an aspect of the first preferred embodiment of this invention.

Further referring to FIG. 7, each connection controlling circuit comprises first and second two-input AND gates 66 and 67, both accompanying the memory 65 of the controlling circuit under consideration and enabled by the enabling signal produced by the last-mentioned memory 65. The first AND gates 66 of the controlling circuits assigned to each of the transducers 23 are connected to the second OR gate 62 accompanying the transducer under consideration through a relevant one of clock transmission leads 68, M in number. The clock pulses of the second clock pulse sequence 2CL corresponding to the relevant high-speed signal sequence, for which the sub-bursts are to be produced by a specific transducer specified by the designation signal, pass through the enabled first AND gate 66 and are supplied to the control terminal 29 of the specific transducer through the relevant clock transmission lead 68 for the specific transducer. The first AND gates 66 thus serve as control AND gates. The sub-bursts thereby produced are sent from the transducer output terminal 27 of the specific transducer to the enabled second AND gate 67 through a single sub-burst output lead 69 for the specific transducer and supplied to the pertinent one of the circuit input terminals 41 of the relevant control circuit that corresponds to the specific transducer. The second AND gates 67 thus serve as output AND gates.

A time division multiplex communication device according to a second preferred embodiment of this invention is for time division demultiplexing the high-speed signal sequences received from the respective transponders into reproductions of the original low-speed signal sequences and is similar in structure to the device illustrated with reference to FIGS. 4 through 7. It should, however, be understood in connection with the device for the demultiplication that the senses of flow of the low-speed and high-speed signal sequences are reversed. In the transducer 23 illustrated with reference to FIG. 5, the write-in and read-out switching signals W and R, as named hereinabove, serve as the read-out and write-in switching signals, respectively. Each transducer now serves as an expansion buffer. In each of the control circuits 25 shown in FIGS. 6 and 7, a known driver should be substituted for the OR gate 49. In this connection, the circuit elements depicted as the OR gate 49 should be understood to also represent such drivers. The second clock pulse sequences 2CL are used as write-in clock pulse sequences. In the switching matrix 24 depicted in FIG. 7, the second AND gates 67 serve as input AND gates and are supplied, rather than with the sub-bursts from the specific transducer through the sub-burst output lead 69 therefor, with the high-speed signal sequences from the drivers 49 through the sub-burst input leads 47, which should now be referred to as high-speed signal sequence input leads, to supply a relevant one of the high-speed signal sequences to the specific transducer through the sub-burst output lead 69, which should now be termed a high-speed signal sequence input lead.

When the low-speed signal sequences are low-frequency analog signal sequences, a sampling rate at which the sequences are sampled into PAM signal sequences of a lower rate should be understood to be the first rate. For PAM signal sequences of the first and second rates herein described, use is possible of an analog delay circuit having an electrically controllable delay as the transducer for compressing the signal sequence of the first rate or expanding the signal sequence of the second rate. Such as delay circuit may be a charge coupled device (CCD) or a bucket brigade device (BBD).

What is claimed is:

1. In a time division multiplex communication device for carrying out conversion between a preselected portion of each of a plurality of first signal sequences of a first rate, N in number, and a prescribed portion of each of a plurality of second signal sequences of a second rate, M in number, in response to both first clock pulse sequences corresponding to respective ones of said first signal sequences and to second clock pulse sequences corresponding to respective ones of said second signal sequences, said first rate being lower than said second rate, the number N being greater than the number M, the preselected portion of a pertinent one of said first signal sequences being an expansion with respect to time of the prescribed portion of a relevant one of said second signal sequences, the prescribed portions of said second signal sequences being determined as a function of the timing of said second clock pulse sequences, a combination which comprises:

a plurality of first device terminals (21) equal in number to the number of said plurality of first signal sequences, each of said first device terminals for receiving a respective one of said first signal sequences;

a plurality of second device terminals (22) equal in number of the number of said plurality of first signal sequences, each of said second device terminals for receiving a respective one of said second signal sequences;

a plurality of transducers (23) equal in number to the number of said plurality of first signal sequences, each of said transducers having a first and a second transducer terminal and a control terminal, said first transducer terminal of each said transducer being connected to a respective one of said first device terminals whereby each of said transducers is associated with a respective one of said first signal sequences, each of said transducers being capable of performing a conversion between a preselected portion of its associated said first signal sequence and a prescribed portion of that one of said second signal sequences which appears at the second transducer terminal thereof, each of said transducers carrying out said conversion in response to both that one of said first clock pulse sequences which corresponds to said first signal sequence associated therewith and to a control signal comprising a first and a second part and suppied to said control terminal thereof;

a plurality of control circuits (25) equal in number to the number of said plurality of second signal sequences, each of said control circuits having a plurality of first circuit terminals, said first circuit terminal of each of said control circuits being coupled to each of said transducers, and a second circuit terminal, said second circuit terminal of each said control circuits being connected to a respective one of said second device terminals whereby each of said control circuits is associated with a different one of said second signal sequences, each of said control circuits receiving on a third terminal thereof that one of said second clock pulse sequences which corresponds to said second signal sequences associated therewith, each of said control circuits being capable of producing a designation signal indicative of a specific one of said transducers in compliance with the timing of said second clock pulse sequence received thereby;

means (61) coupled between said control terminals of said transducers and said control circuits for supplying each designation signal to the control terminal of the transducer specified thereby as said first part of said control signal;

enabling means (65) connected to said control circuits for producing an enabling signal in response to said designation signal;

first means connected to said enabling means and to said control terminals of each of said transducers for supplying, in response to said enabling signal, the second clock pulses of said second clock pulse sequence which is associated with the said control circuit which produced said designation signal to the control terminal of said transducer indicated by said designation signal as said second part of said control signal; and second means (67) connected to said enabling means, said second transducer terminals of each of said transducers, and said first circuit terminals of each of said control circuits for transmitting, in response to said enabling signal, the prescribed portion of said second signal sequence associated with said transducer indicated by said designation signal between said second transducer terminal of said transducer indicated by said designation signal and said first circuit terminal of a said control circuit which produced said designation signal;

each of said control circuits comprising transfer means (49) between the first circuit terminals thereof and the second circuit terminal thereof for transferring therebetween the prescribed portion of the second signal sequence appearing at the second circuit terminal thereof, the transfer means of said control circuit thereby transferring the prescribed portion of said pertinent second signal sequence between the first circuit terminal thereof and the second circuit terminal thereof.

2. A time division multiplex communication device as claimed in claim 1, wherein each of said control circuits comprises means for successively producing timing pulses in response to said second clock pulse sequence associated therewith, means for producing a controlling signal once in a predetermined duration of said second signal sequence associated therewith, and a designation signal generator for producing said designation signal in response to said timing pulses and said controlling signal, said predetermined duration covering a plurality of the prescribed portions of said second signal sequence associated therewith.

3. A time division multiplex communication device as claimed in claim 2, wherein said designation signal generator comprises a code generator responsive to said timing pulses for cyclically producing designation codes corresponding to said transducers, respectively, a decoder having output leads corresponding to the respective transducers for decoding said designation codes to cyclically energize said output leads, and a plurality of AND gates connected to the respective output leads to be cyclically enabled upon energization of said output leads and to said controlling signal producing means to be simultaneously supplied with said controlling signal, one of said AND gates that is connected to the output lead energized upon production of said controlling signal allowing said controlling signal to pass therethrough as said designation signal.

4. A time division multiplex communication device as claimed in claim 1, wherein said enabling means comprises a plurality of memories assigned to the respective transducers, on the one hand, and to the respective control circuits, on the other hand, the memories assigned to the respective transducers and to each of said control circuits being connected to said each control circuit, a specific one of said memories that is assigned to said specific transducer and to said relevant control circuit being set in response to said designation signal to produce said enabling signal.

5. A time division multiplex communication device as claimed in claim 4, wherein each of said memories comprises means for automatically resetting said each memory, after said each memory is set, unless said relevant control circuit produces a next following designation signal predetermined duration after production of the designation signal by which said each memory is set.

6. A time division multiplex communication device as claimed in claim 4, wherein said first means comprises a plurality of control AND gates connected to the respective memories and to the control terminals of the respective transducers, the control AND gates which are connected to the memories connected, in turn, to each of said control circuits being supplied with a relevant one of said second clock pulse sequences that corresponds to the second signal sequence appearing at the second circuit terminal thereof, a specific one of said control AND gates that is connected to said specific memory being enabled by said enabling signal to supply the second clock pulses of said particular second clock pulse sequence to the control terminal of said specific transducer.

7. A time division multiplex communication device as claimed in claim 6 for carrying out conversion of the preselected portions of said first signal sequences to the prescribed portions of said second signal sequences, wherein said second means comprises a plurality of output AND gates connected to the respective memories, the second transducer terminals of the respective transducers, and the respective first circuit terminals of said control circuits, a specific one of said output AND gates that is connected to said specific memory being enabled by said enabling signal to transmit the prescribed portion of said pertinent second signal sequence from the second transducer terminal of said specific transducer to said relevant first circuit terminal.

8. A time division multiplex communication device as claimed in claim 7, wherein said transfer means of each of said control circuits comprises an OR gate between the first circuit terminals thereof and the second circuit terminal thereof for transmitting the prescribed portion of the second signal sequence appearing at the second circuit terminal thereof from any one of the first circuit terminals thereof.

9. A time division multiplex communication device as claimed in claim 6 for carrying out conversion of the prescribed portions of said second signal sequences to the preselected portions of said first signal sequences, wherein said second means comprises a plurality of input AND gates connected to the respective memories, the second transducer terminals of the respective transducers, and the respective first circuit terminals of said control circuits, a specific one of said input AND gates that is connected to said specific memory being enabled by said enabling signal to transmit the prescribed portion of said pertient second signal sequence from said relevant first circuit terminal to the second transducer terminal of said specific transducer.

10. A time division multiplex communication device as claimed in claim 9, wherein said transfer means of each of said control circuits comprises a driver between the first circuit terminals thereof and the second circuit terminal thereof for transmitting the prescribed portion of the second signal sequence appearing at the second circuit terminal thereof to any one of the first circuit terminals thereof.

* * * * *